Dec. 18, 1934.    W. C. BABIN    1,984,621
MAKE-UP TONG
Filed May 20, 1929
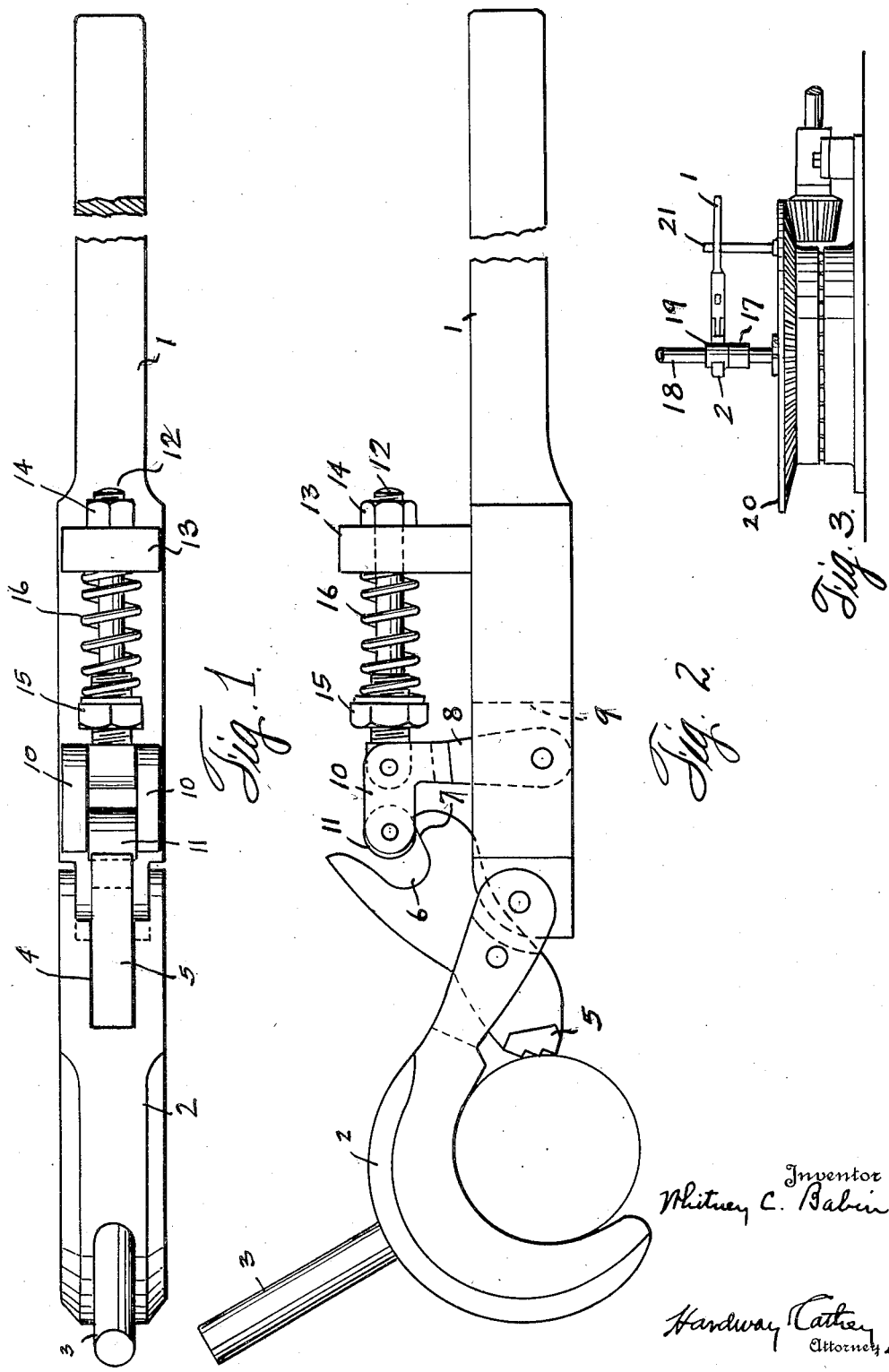

Patented Dec. 18, 1934

1,984,621

UNITED STATES PATENT OFFICE 1,984,621

MAKE-UP TONG

Whitney C. Babin, Beaumont, Tex., assignor, by direct and mesne assignments, to Beaumont Texan Tool Company, Beaumont, Tex., a corporation of Texas Application May 20, 1929, Serial No. 364,635

8 Claims. (Cl. 81—53)

This invention relates to new and useful improvements in a make up tong.

One object of the invention is to provide a tong of the character described specially adapted for use in screwing together the tool joint members of a drill stem in making up said stem, and which will release when subjected to a predetermined strain so as to prevent the breakage of any of the parts.

With the above and other objects in view this invention has particular relation to certain novel features of construction, operation and arrangement of parts an example of which is given in this specification and illustrated in the accompanying drawing, wherein:—

Figure 1 shows a rear view of the tong.

Figure 2 shows a side view thereof, and

Figure 3 shows a side view of a rotary drilling machine showing the tong applied, as in use.

Referring now more particularly to the drawing, the numeral 1 designates the tong handle pivoted to the operative end of which there is an arcuate clamp or jaw 2 shaped to engage around the object to be turned. This clamp has a grip 3 by means of which it may be manipulated. The shank or pivoted end of the clamp has a slot 4 through which the jaw 5 extends. This second jaw is pivoted in the first jaw or clamp 2 and its inner end is toothed to engage the object to be turned. The outer end or shank of the jaw 5 has a notch 6 one side of which is formed into a cam face 7.

There is a lever 8 one end of which is pivoted, in the slot 9, to the handle 1 and whose other end is overturned and bifurcated forming the fingers 10, 10. There is a roller 11 between the fingers 10 which rides on the face 7. A rod 12 has one end pivoted between the fingers 10 and its outer end works through a bearing in the lug 13 upstanding from the handle 1. This rod has a nut 14 screwed on its outer end which prevents the detachment of said rod from said lug, and adjacent its pivoted end the rod 12 has a nut 15 thereon and a coil spring 16 surrounds the rod 12 and is interposed between the nut 15 and the lug 13. The shanks of the two jaws, the lever 8, and that end of the handle to which they are pivoted, form a bar linkage which will separate when the roller 11 passes off the face 7 and release the shank of the jaw 5 to open the tong. The parts 7, 8, 10 and 11 may be termed a linkage.

In operation the tong is applied to one of the tool joint members, as 19, of a drill stem, as 18. The other tool joint member 17 and the stem beneath is held, in the conventional manner, against rotation. The rotary table 20 may then be rotated to carry the back up post 21 around against the handle 1 and the tong will be revolved and the joint thereby screwed up. While the joint is being screwed up the bearing 11 operating against the face 7 will hold the jaw 5 in engagement with the stem 18. When the joint is screwed up the additional strain imparted to the tong by the back up post 21 will cause the spring 16 to compress and the roller to ride off of the face 7 and the jaw 5, and the tong, will release the stem thus preventing breakage of parts.

What I claim is:

1. A tong including a handle, an arcuate clamp pivoted to one end thereof, a jaw pivoted to the clamp, and having a bearing face, a lever pivoted to the handle and having a bearing, which rides on said face, and spring means on said handle holding said bearing yieldingly in contact with said face, but adapted to yield to release said bearing face when a predetermined torque is exerted on said handle.

2. A tong including a handle, a pipe engaging clamp and a pipe engaging jaw associated with one end of said handle, a yieldable lever connected to the handle, said jaw having a cam face and said lever having a bearing effective to operate against said face to hold said jaw in operative engagement with the pipe in said clamp.

3. A tong including a handle, a pipe engaging clamp and a pipe engaging jaw, connected to one end of the handle and effective to engage and turn a pipe held thereby, spring means, and a lever movable thereby on the handle and in engagement with the jaw and effective to hold said jaw in engagement with said pipe, said spring means being adapted to sustain a predetermined load during the manipulation of the tong, but to yield when said load is exceeded, so that said jaw will release the pipe.

4. A tong including a handle, a clamp pivoted to one end thereof and shaped to engage around a pipe to be turned, a dog pivoted to the handle, a jaw at one end of the dog adapted to cooperate with the clamp to engage and turn the pipe, a lever pivoted to the handle and one end of which engages the other end of said dog to hold the jaw in engagement with the pipe, a yieldable seat acting against the other end of the lever and normally effective to hold the lever in such engagement with said dog to prevent the release of the jaw from said pipe.

5. A tong including a handle, a clamp pivoted to one end thereof and shaped to engage around a pipe to be turned, a dog pivoted to the handle, a jaw at one end of the dog adapted to cooperate with the clamp to engage and turn the pipe, a lever pivoted to the handle and one end of which engages the other end of said dog to hold the jaw in engagement with the pipe, a yieldable seat acting against the other end of the lever and normally effective to hold the lever in such engagement with said dog to prevent the release of the jaw from said pipe, and means for varying the resistance of said seat against said lever.

6. An automatically releasable tong of the character described including two pivotal jaws having shanks, and a bar linkage adapted to separate and release one jaw shank when a predetermined torque has been exerted on the pipe.

7. A pipe tong of the character described including a handle, a jaw pivoted thereto, a second jaw pivoted to said first jaw, and a linkage connected to said second jaw and said handle to exert a pull upon said jaw, said linkage including means to release said second jaw when a predetermined force is exerted on said handle.

8. A pipe tong of the character described including a jaw member, a second jaw and a handle pivoted to said first jaw at different points, and a link releasably connecting said handle and said second jaw so that movement of said handle will cause relative pivoting of said jaw members, said link being releasable from said jaw upon the exertion of a predetermined thrust on said tong.

WHITNEY C. BABIN.